United States Patent
Bryngelsson et al.

(10) Patent No.: US 11,192,467 B2
(45) Date of Patent: Dec. 7, 2021

(54) METHOD FOR BALANCING AN ELECTRICAL ENERGY STORAGE MODULE

(71) Applicant: VOLVO TRUCK CORPORATION, Gothenburg (SE)

(72) Inventors: Hanna Bryngelsson, Gothenburg (SE); Jonas Hellgren, Gothenburg (SE)

(73) Assignee: VOLVO TRUCK CORPORATION, Gothenburg (SE)

(*) Notice: Subject to any disclaimer, the term of this patent is extended or adjusted under 35 U.S.C. 154(b) by 273 days.

(21) Appl. No.: 16/462,634

(22) PCT Filed: Dec. 1, 2016

(86) PCT No.: PCT/EP2016/079456
§ 371 (c)(1),
(2) Date: May 21, 2019

(87) PCT Pub. No.: WO2018/099566
PCT Pub. Date: Jun. 7, 2018

(65) Prior Publication Data
US 2019/0299811 A1    Oct. 3, 2019

(51) Int. Cl.
*B60L 58/22*    (2019.01)
*B60L 50/60*    (2019.01)
(Continued)

(52) U.S. Cl.
CPC ............. *B60L 58/22* (2019.02); *B60L 50/66* (2019.02); *B60L 58/12* (2019.02); *B60L 58/16* (2019.02);
(Continued)

(58) Field of Classification Search
CPC .......... B60L 58/22; B60L 58/12; B60L 50/66; B60L 58/16; B60L 2260/44;
(Continued)

(56) References Cited

U.S. PATENT DOCUMENTS 7,193,392 B2 * 3/2007 King .................... H02J 7/0016
                                                            320/118
8,306,781 B2 * 11/2012 Xu ........................ G01R 31/367
                                                            702/183
(Continued)

FOREIGN PATENT DOCUMENTS

CN          110395142 A  * 11/2019  .............. B60L 58/22
DE       112011102573 T5    5/2013
(Continued)

OTHER PUBLICATIONS

Korean Office Action dated Feb. 16, 2021 in corresponding Korean Application No. 10-2019-7019021, 6 pages.
(Continued)

*Primary Examiner* — M Baye Diao
(74) *Attorney, Agent, or Firm* — Venable LLP; Jeffri A. Kaminski (57) ABSTRACT

The invention relates to a method for balancing an electrical energy storage module (1) comprising a plurality of units (3) for an electric vehicle (5). The energy storage module (1) is operative according to a first balancing target type. A present operating condition of the energy storage module is determined (S402), and a future operating condition of the energy storage module is determined (S404). Further, there is selected (S406) a second balancing target type among a plurality of predetermined balancing targets (204) based on the present operating condition and the future operating condition, each of the balancing targets being indicative of an energy storage unit characteristic to be balanced in order to achieve the balancing target type. There is further provided to switch (S408) from balancing the energy storage module according to the first balancing target type to balancing the energy storage module according to the second balancing target type.

16 Claims, 5 Drawing Sheets

(51) Int. Cl.
  *B60L 58/16*  (2019.01)
  *B60L 58/12*  (2019.01)

(52) U.S. Cl.
  CPC ..... *B60L 2240/545* (2013.01); *B60L 2240/60* (2013.01); *B60L 2240/622* (2013.01); *B60L 2240/625* (2013.01); *B60L 2240/662* (2013.01); *B60L 2260/44* (2013.01); *B60L 2260/54* (2013.01); *Y02T 10/70* (2013.01); *Y02T 10/72* (2013.01); *Y02T 90/16* (2013.01)

(58) Field of Classification Search
  CPC ........... B60L 2240/545; B60L 2240/60; B60L 2240/622; B60L 2240/625; B60L 2240/662; B60L 2260/54; B60L 2200/36; B60L 2200/18; B60L 2200/40; Y02T 10/70; Y02T 10/72; Y02T 90/16; B60Y 2200/91; B60Y 2200/92; B60Y 2200/14; B60Y 2200/11; B60Y 2200/41
  USPC ........................................................ 320/134
  See application file for complete search history.

(56) References Cited

U.S. PATENT DOCUMENTS

| | | | |
|---|---|---|---|
| 9,766,298 B2 * | 9/2017 | Lennevi | B60L 3/12 |
| 10,263,436 B2 * | 4/2019 | Beaston | H02J 7/0021 |
| 10,355,498 B2 * | 7/2019 | LePort | H02J 7/0029 |
| 2002/0120906 A1 * | 8/2002 | Xia | H01M 8/04992 |
| | | | 716/111 |
| 2006/0097698 A1 | 5/2006 | Plett | |
| 2010/0138178 A1 * | 6/2010 | Paryani | G01R 31/3842 |
| | | | 702/63 |
| 2011/0054815 A1 * | 3/2011 | Xu | G01R 31/367 |
| | | | 702/63 |
| 2012/0074894 A1 * | 3/2012 | Chen | H02J 7/00 |
| | | | 320/103 |
| 2013/0030620 A1 | 1/2013 | Blakemore et al. | |
| 2013/0043840 A1 | 2/2013 | Bylsma et al. | |
| 2014/0114594 A1 | 4/2014 | Schaefer | |
| 2014/0152232 A1 | 6/2014 | Johnson et al. | |
| 2014/0159665 A1 | 6/2014 | Boehm et al. | |
| 2015/0207344 A1 | 7/2015 | Wang et al. | |
| 2015/0331055 A1 * | 11/2015 | Oi | B60W 40/00 |
| | | | 702/63 |
| 2016/0380460 A1 * | 12/2016 | Dominguez Amarillo | H02J 7/0063 |
| | | | 307/74 |

FOREIGN PATENT DOCUMENTS

| | | | | |
|---|---|---|---|---|
| EP | 1367688 A1 * | 12/2003 | ............ | H02J 7/0016 |
| JP | 2010081731 A | 4/2010 | | |
| JP | 2012175734 A | 9/2012 | | |
| JP | 5098983 B2 * | 12/2012 | ............ | H02J 7/0014 |
| KR | 20100019256 A | 2/2010 | | |

OTHER PUBLICATIONS

International Search Report and Written Opinion dated Aug. 28, 2017 in International Application No. PCT/EP2016/079456.
Korean Office Action dated Aug. 5, 2020 in corresponding Korean Application No. 10-2019-7019021, 5 pages.

* cited by examiner

METHOD FOR BALANCING AN ELECTRICAL ENERGY STORAGE MODULE

TECHNICAL FIELD

The invention relates to a method for balancing an electrical energy storage module comprising a plurality of energy storage units for an electric vehicle.

The invention can be applied in any type of electric or hybrid vehicle, such as trucks, buses, cars, and construction equipment. Although the invention will be described with respect to an electrical bus, the invention is not restricted to this particular vehicle.

BACKGROUND

Batteries are becoming a more common source of power for providing propulsion for vehicles. Such batteries are most often rechargeable batteries and consist of several battery cells that may be connected in series and/or in parallel forming a complete battery pack for the vehicle. The quality of the battery pack is highly dependent on the quality of each battery cell setting tough requirements on the production quality of the battery cells. However, the battery cells may nevertheless have somewhat different capacities despite the high quality and may also age differently due to e.g. different operating temperature of each battery cell. In addition, differences in the dynamics of the individual battery cells, for example self-discharge between cells, lead to an uneven charge level distribution of the battery pack.

Overall, the state of charge for the battery units will eventually drift apart leading to an uneven state-of-charge distribution which limits the performance of the battery pack. For example, the discharge capabilities of the battery module will be set by the battery cell with the lowest state of charge which thus limits the entire performance of the battery pack.

In order to avoid the uneven distribution of state of charge selected battery cells may be charged or discharged in order to equalize the state of charge of the battery pack. US2006/0097698 discloses a method for cell equalization for equalizing the state of charge of a battery pack in order to maximize the available power from the battery pack. The method disclosed by US2006/0097698 is based on ranking the state of charge of the battery cells and depleting charge or adding charge to battery cells according to the ranking.

However, there are differences in e.g. battery cell capacity between individual battery cells as described above that complicates equalization of the battery pack. Furthermore, the desired performance requirement of the battery pack is not constant over a drive cycle. The equalization method proposed by US2006/0097698 does not take such considerations into account. Consequently, there is still room for improvement with regards to making efficient use of the battery module performance.

SUMMARY

An object of the invention is to provide a method and a system for balancing an electrical energy storage module, which method and system are able to switch between balancing target types for dynamically optimizing the electrical energy storage module performance depending on future operating condition of the energy storage module. The object is at least partly achieved by a method according to claim 1.

According to a first aspect of the invention, there is provided a method for balancing an electrical energy storage module comprising a plurality of electrical energy storage units for an electric vehicle, the energy storage module is operative according to a first balancing target type, wherein the method comprising: determining a present operating condition of the energy storage module; determining a future operating condition of the energy storage module; selecting a second balancing target type among a plurality of predetermined balancing target types based on the present operating condition and the future operating condition, each of the balancing target types being indicative of an energy storage unit characteristic to be balanced; and switching from balancing the energy storage module according to the first balancing target type to balancing the energy storage module according to the second balancing target type.

Accordingly, the electrical energy storage module may be operative according to a first balancing target type for balancing an energy storage characteristic of the energy storage module. However, in order to make efficient use of the electrical energy storage module in different situations it is advantageous to switch from balancing according to the first balancing target type to balancing according to a second balancing target type. The decision to switch from the first balancing target type to the second balancing target type is based on the present operating condition of the electrical energy storage module and a future operating condition of the electrical energy storage module. The future operating condition may be related to an estimated use situation for the electrical energy storage module.

The plurality of balancing target types are each indicative of a respective energy storage unit characteristic to be balanced which is different from the other respective energy storage unit characteristic to be balanced according to the other balancing target types.

The invention is thus based on the realization that in order to optimize the performance of the electrical energy storage module, dynamic switching between different balancing target types may be introduced. In this way, the invention advantageously enables to balance the electrical energy storage module to be optimized for a future operating condition for the electrical energy storage module. Since the energy storage unit characteristics may be different from unit to unit, thus only balancing with respect to one energy storage unit characteristic is not always the most optimal strategy for optimizing the performance of the energy storage module in all situations. For example, it may not always be optimal to balance the state of charge of the electrical energy storage module, in such case, with the invention another balancing target type is advantageously selected which is better suited for the future need of the electrical energy storage module.

According to one embodiment, the future operating condition is determined based on route information for the vehicle. The route information may for example be related to time duration to an event which may affect the operating condition of the electrical energy storage module. The route information may further be related to a distance (e.g. a driving range) to such an event. The route information may further relate to an upcoming downhill or uphill, or distance to a charge station. Basing the future operating condition on route information hereby provides an advantageous way of estimating future use situations for the electrical energy storage module in which a specific future operating condition may be beneficial for selecting the balancing target type.

The route information may for example be received from a global positioning system. Alternatively or additionally, the route information may be indicative of a predetermined route for the vehicle, wherein the method may further comprise: retrieving the route information before the vehicle is operative on the predetermined route. Such predetermined route may for example be locally stored in a memory of the vehicle, or be retrieved from a remote database (e.g. via "the cloud"). Alternatively or additionally, the route information may be receive from communication units associated with bus stops, via radio frequency identification (RFID), or GSM network, or any other mobile network.

In one embodiment, the plurality of balancing target types may comprise: a first balancing target type comprising to balance the state of charge of the energy storage units with respect the each other, and a second balancing target type comprising to balance the open circuit voltage of the energy storage units with respect to each other. Thus, balancing of the electrical energy storage module may switch between balancing according to the state of charge of the energy storage units to balancing according to the open circuit voltage of the energy storage units. State of charge is typically stated in terms of percentage of the total capacity of the units that is available. Open circuit voltage is the voltage of the unit in an unloaded state. The state of charge and open circuit voltage are well known energy storage characteristics for the person skilled in the art. In case the state of charge estimation is estimated with high accuracy, the balancing can advantageously be performed with regards to state of charge in order to optimize the usable energy of the electrical energy storage module. However, in case the state of charge estimation has low accuracy, it may be advantageous to instead balance the electrical energy storage module with regards to the open circuit voltage to optimize the usable energy of the electrical energy storage module.

The plurality of balancing target types may comprise to balance: charge power capability, discharge power capability, energy storage unit temperature, energy storage unit aging rate, and energy storage unit impedance. These are exemplary energy storage unit characteristics in addition to the above mentioned state of charge and open circuit voltage. Thus, a plurality of balancing target types may advantageously be implemented which may improve the performance of the energy storage module further.

The present operating condition may comprise at least one of an average charge power, an average discharge power, a peak charge power, a peak discharge power, energy storage unit temperature, or ambient temperature, capacity, open circuit voltage, impedance, of the energy storage units or combinations thereof. Thus, a plurality of operating conditions may advantageously be included in embodiments of the inventions for improved accuracy of selecting the most suitable balancing type.

In order to balance according to a balancing target type, it is advantageously performed a step of discharging or charging selected energy storage units such that the distribution of energy storage unit characteristics of the plurality of energy storage units is normal distributed, or such that the energy storage unit characteristics of the plurality of energy storage unit is equal.

The future operating condition may comprise at least one of: time to a charging event and magnitude of the charging event, time to discharging event and magnitude of the discharging event, range of driving cycle, required driving range, or combinations thereof. Thus, with a plurality of future operating conditions the accuracy of selecting balancing type may be improved.

The energy storage unit may be a single battery cell, whereby the energy storage module is a battery pack for the vehicle.

Alternatively, the energy storage unit is a battery pack comprising a plurality of battery cells. In this case the energy storage module comprises plurality of battery packs, whereby the balancing is performed for the energy storage module with regards to the battery packs.

An energy storage cell may be a Li-ion battery cell, although other battery cells known in the art would be equally applicable.

The object is at least partly achieved also by a system according to claim 11.

According to a second aspect of the invention, there is provided a system for balancing an electrical energy storage module comprising a plurality of energy storage units for an electric vehicle, the system comprising a battery management unit comprising means for determining a state of charge of the energy storage units and means for determining an open circuit voltage of the energy storage units and a control unit, the energy storage module is operative according to a first balancing target type, the battery management unit being configured to: determine a present operating condition of the energy storage module; wherein the battery management unit is further configured to: determine a future operating condition of the electrical energy storage module; select a second balancing target type among a plurality of predetermined balancing target types based on the present operating condition, the future operating condition, the balancing target types being indicative of an energy storage unit characteristic to be balanced; and switch from balancing the energy storage module according to the first balancing target type to balancing the energy storage module according to the second balancing target type.

According to one embodiment, the system further comprises a discharging unit configured to, according to a balancing target type, discharge selected energy storage units such that the distribution of energy storage unit characteristics of the plurality of energy storage unit is normal distributed, or such that the energy storage unit characteristics of the plurality of energy storage unit is equal.

According to one embodiment, the system further comprises a charging unit configured to, according to a balancing target type, charge selected energy storage units such that the distribution of energy storage unit characteristics of the plurality of energy storage unit is normal distributed, or such that the energy storage unit characteristics of the plurality of energy storage unit is equal.

According to one embodiment, the battery management unit may be configured to receive the route information from a GPS in the vehicle.

According to one embodiment, the battery management unit may be configured to receive the route information from communication units associated with bus stops, via RFID communication, or GSM network, or any other mobile network. With these sources of information, positioning information for the vehicle may be obtained.

Effects and features of the second aspect of the invention are largely analogous to those described above in connection with the first aspect.

There is further provided a vehicle comprising an energy storage module comprising a plurality of energy storage units; and a system according to the second aspect.

The vehicle may be an electrical vehicle comprising an electrical engine, wherein the energy storage module provides power to the electrical engine for providing propulsion for the electrical vehicle.

Furthermore, there is provided a computer program comprising program code means for performing the steps of any of the embodiments of the first aspect when the program is run on a computer.

Furthermore, there is provided a computer readable medium carrying a computer program comprising program code means for performing the steps of any of the embodiments of the first aspect when the program product is run on a computer.

Additionally, there is provided a control unit for controlling balancing of an energy storage module comprising a plurality of energy storage units for an electric vehicle, the control unit being configured to perform the steps of any of the embodiments of the first aspect.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. The skilled person will recognize that many changes and modifications may be made within the scope of the appended claims. Like reference character refer to like elements throughout the description.

Figure 1:
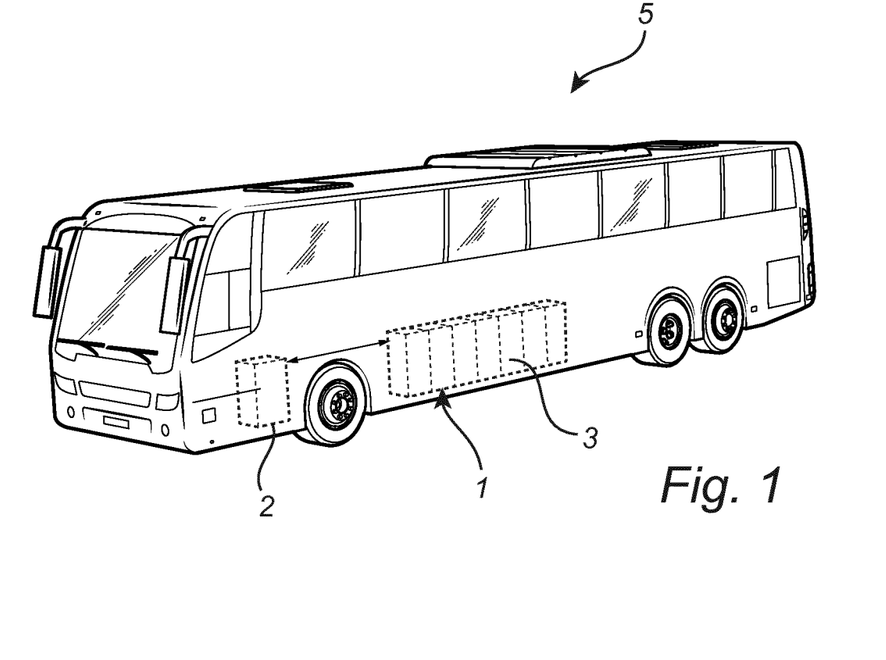
FIG. 1 is a vehicle in the form an electrical bus according to example embodiments of the invention.

FIG. 1 illustrates a vehicle in the form of an electrical bus 5 comprising an electrical energy storage module in the form of a battery module 1 with a plurality of battery units 3. The battery module 1 is arranged to provide power to an electrical engine (not shown) arranged for providing propulsion for the electrical bus 5. The electrical bus 5 further comprises a battery management unit 2 which is configured to balance the battery module according to a balancing target type. The battery management unit 2 is further configured to monitor battery unit characteristics such as state of charge and open circuit voltage of the battery units 3. The battery module 1 of the electrical bus 5 is operative according to a first balancing target type, for example, the battery module may be operative to balance the open circuit voltage of the battery module 1. The battery units 3 may be individual battery cells 3 for a battery pack 1. Alternatively, the battery units may each comprise several battery cells, whereby each battery unit forms a battery pack. In such case, the battery module comprises a plurality of interconnected battery packs.

The battery management unit 2 may include a microprocessor, microcontroller, programmable digital signal processor or another programmable device. Thus, the battery management unit 2 comprises electronic circuits and connections (not shown) as well as processing circuitry (not shown) such that the battery management unit 2 can communicate with different parts of the bus 1 such as the brakes, suspension, driveline, in particular an electrical engine, an electric machine, a clutch, and a gearbox in order to at least partly operate the bus 1. The battery management unit 2 may comprise modules in either hardware or software, or partially in hardware or software and communicate using known transmission buses such as CAN-bus and/or wireless communication capabilities. The processing circuitry may be a general purpose processor or a specific processor. The battery management unit 2 comprises a non-transistory memory for storing computer program code and data upon. Thus, the skilled addressee realizes that the battery management unit 2 may be embodied by many different constructions.

Figure 2:
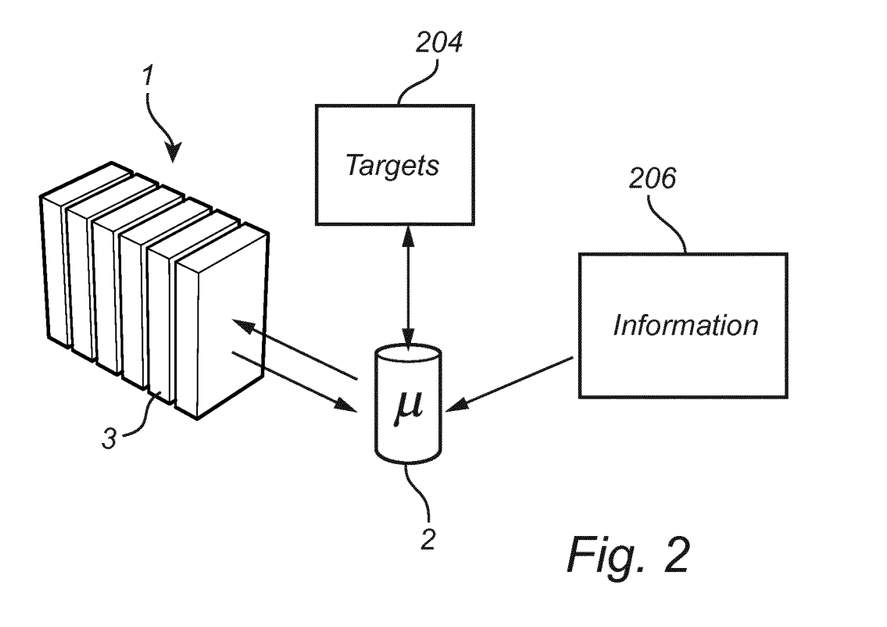
FIG. 2 is an overview of a conceptual system according to an embodiment of the invention.

FIG. 2 is a conceptual overview of embodiments of the invention. The battery management unit 2 may receive information from the battery module 1 indicative of a present operating condition of the battery module 1. Such present operating condition for the battery unit may be average charge power (for a certain time period), an average discharge power (for a certain time period), a peak charge power, a peak discharge power, battery unit temperature, or ambient temperature, capacity, open circuit voltage, impedance, or combinations thereof. The battery management unit 2 may also provide charging or discharging of individual units if required for e.g. balancing. In addition, the battery management unit 2 instructs balancing of the battery module 1 according to a plurality of balancing target types 204. For this purpose, the battery management unit 2 samples data from the battery module 1 indicative of the present operating condition of the battery module 1. Further, the battery management unit 2 determines a future operating condition which is indicative of a future use, i.e. the future operating condition is based on future use information 206 such as future estimated energy consumption. Optionally, the future use information 206 comprises route information for the vehicle. The battery management unit 2 evaluates the present operating condition and the future operating condition in order to select the best suitable balancing target type among the plurality of balancing target types 204. Based on the evaluation, the battery management unit 2 may determine to switch from balancing according to a first balancing target type, to balancing according to a second balancing target type. It should be noted that the balancing target types is each indicative of an energy storage unit characteristics to be balanced, in other words an energy storage unit characteristic to be altered. Furthermore, each of the balancing target types is indicative of a unique such energy storage unit characteristic.

Figure 3A:
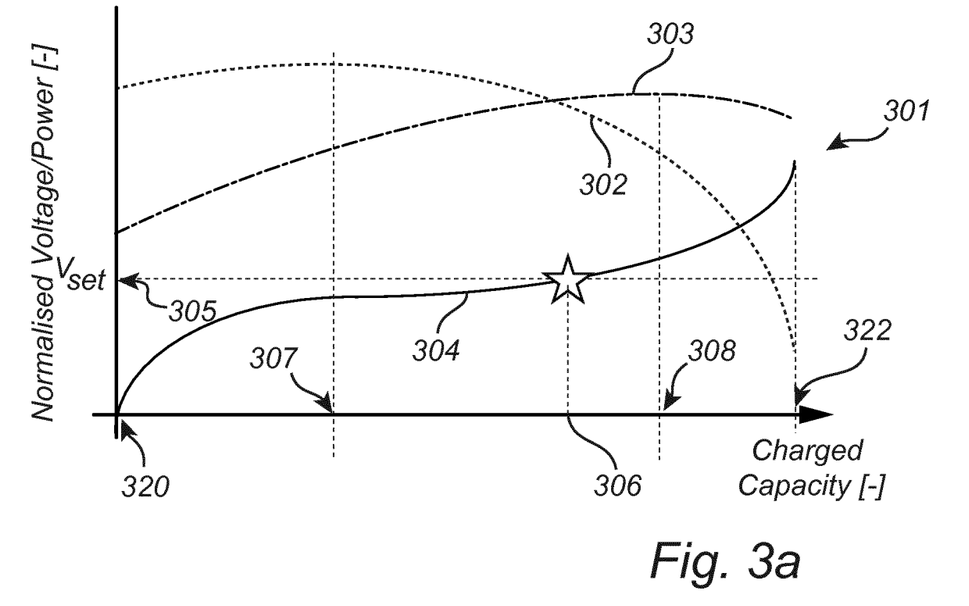
FIG. 3a-b schematically illustrates different energy storage unit characteristics for two different energy storage units.
Figure 3B:
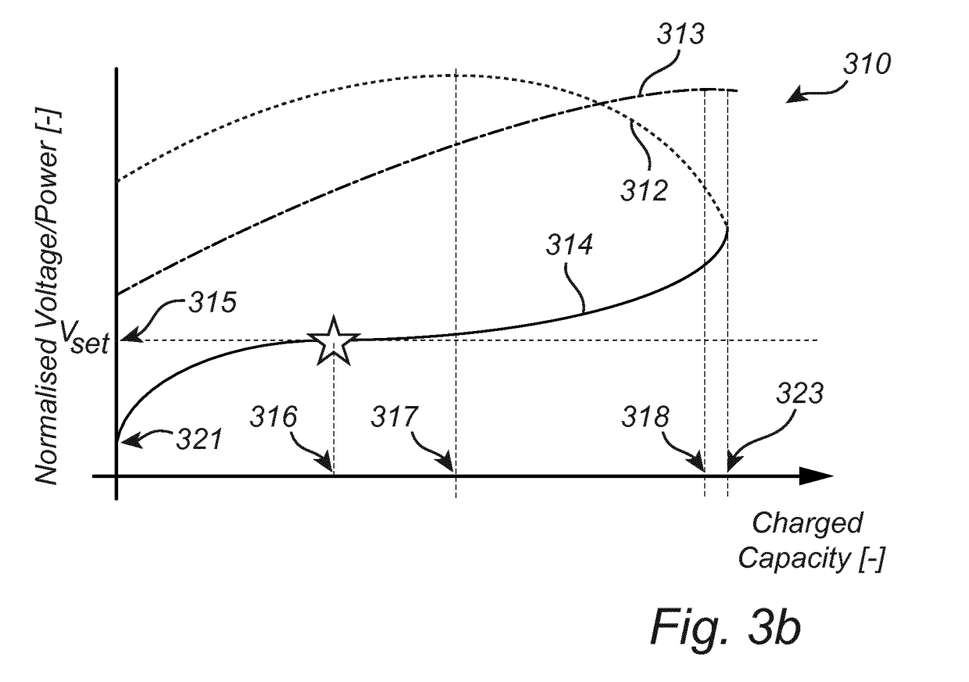

FIGS. 3a-b are charts (301 and 310) schematically illustrating battery unit characteristics for two different battery units (FIG. 3a and FIG. 3b respectively). The characteristics shown in FIGS. 3a-b are shown for battery cells, e.g. Li-ion battery cells. FIG. 3a shows three different curves representative of battery cell characteristics for a first battery cell: curve 304 shows open circuit voltage versus state of charge (i.e. state of charge in terms of charge capacity, x-axis), curve 303 shows discharge power versus state of charge, and curve 302 shows charge power versus state of charge. FIG. 3b shows three different curves for a second battery cell: curve 314 shows open circuit voltage versus state of charge (i.e. charged capacity), curve 313 shows discharge power versus state of charge, and curve 312 shows charge power versus state of charge. The curves shown in FIGS. 3a-b are examples of battery cell characteristics and shows that the individual characteristics of battery cells may differ from cell to cell. In other words, only balancing with respect to for example state of charge may not always be the optimal strategy for optimizing the performance of the battery module in all situations. For example, the open circuit voltage $V_{set}$ (305 and 315) is here indicated to be at the same level for both battery cells, i.e. in chart 301 and in chart 310 the voltages $V_{set}$ are the same. The corresponding state of charge (in terms of charge capacity, x-axis), is for the first battery cell at 306 (FIG. 3a), and at 316 for the second battery cell (FIG. 3b). As illustrated, the state of charges at 306 and 316 for the battery cells are not the same, despite corresponding to the same open circuit voltage ($V_{set}$). In other words, balancing with respect to open circuit voltage does not necessarily provide the optimal balancing situation with respect to state of charge (and vice versa of course). Furthermore, it may also be noted that the two cells reach 0% state of charge at different open circuit voltage (at 320 for the first cell in FIG. 3a and at 321 for the second cell in FIG. 3b). Furthermore, in this exemplary case, the maximum available capacity of the two cells is different, i.e. the maximum available capacity 322 of the battery cell in FIG. 3a is higher that the maximum available capacity 323 of the battery cell in FIG. 3b.

With further reference to FIGS. 3a-b, it can be observed that the first and the second cell have maximum charge power at different state of charge. In FIG. 3a, the maximum charge power for the first battery cell is indicated as the maximum of curve 302, with the corresponding state of charge at 307. Further, in FIG. 3b, the maximum charge power for the second battery cell is indicated as the maximum of curve 312, with the corresponding state of charge at 317. Thus, by balancing the battery module such that the state of charge is equal for the first battery cell and the second battery cell cannot optimize the available charge power for the battery module/pack. Instead, in such case a balancing target type being to balance with respect to charge power is more appropriate. It should be noted that the maximum of the charge power is here used as an example to illustrate the difference in charge power capacity of the two cells. It is not necessarily the case that the battery module is balanced to the maximum charge power for each battery cell.

Similarly, it can be observed that the first and the second cell have maximum discharge power at different state of charge. In FIG. 3a, the maximum discharge power for the first battery cell is indicated as the maximum of curve 303, with the corresponding state of charge at 308. Further, in FIG. 3b, the maximum discharge power for the second battery cell is indicated as the maximum of curve 313, with the corresponding state of charge at 318. Thus, also in this case, by balancing the battery module such that the state of charge is equal for the first battery cell and the second battery cell cannot optimize the available discharge power for the battery module. Instead, in this case a balancing target type being to balance with respect to the discharge power is more appropriate. It should be noted that the maximum of the discharge power is here used as an example to illustrate the difference in discharge power capacity of the two cells. It is not necessarily the case that the battery module is balanced to the maximum discharge power for each battery cell.

Overall in FIG. 3a-b, it is noted that for optimizing the performance with respect to for example charge power or discharge power, it would in fact be more beneficial to adapt the state of charge (or open circuit voltage) of the battery cells of the battery module such that they (state of charge and/or open circuit voltage) are not balanced, at least in this particular case conceptually illustrated in FIG. 3a-b.

Figure 4:
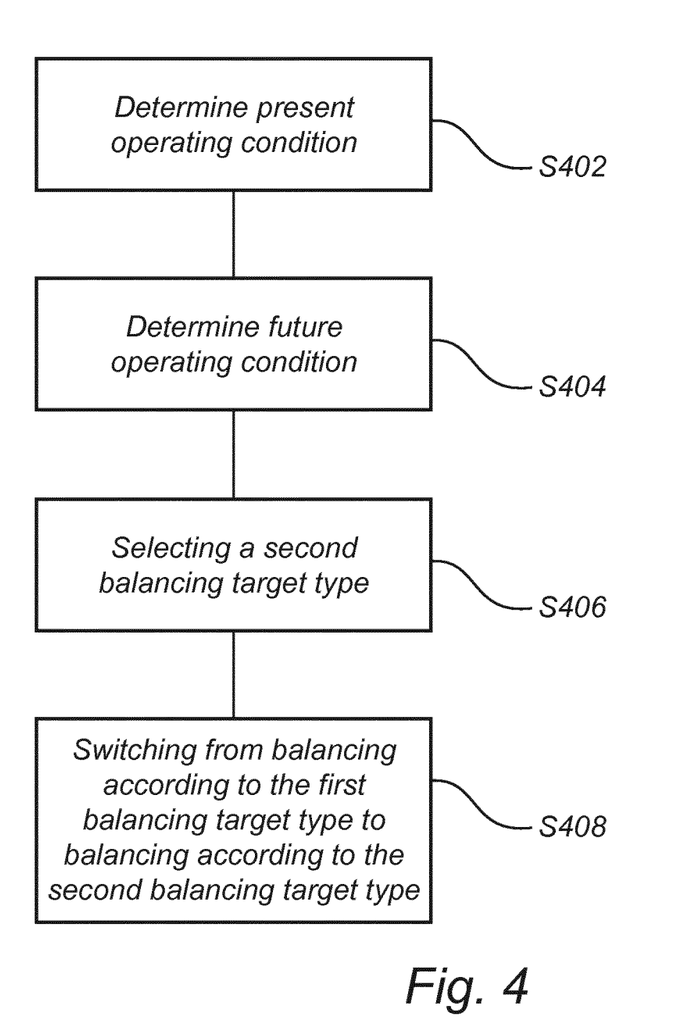
FIG. 4 is a flow-chart of method steps according to an embodiment of the invention.

FIG. 4 is a flow-chart with method steps according to an embodiment of the invention. The method being implemented for balancing an electrical energy storage module (e.g. a battery module) comprising a plurality of energy storage units (e.g. battery units) for an electric vehicle, the battery module is operative according to a first balancing target type. In step S402 a present operating condition of the battery module is determined. In step S404 a future operating condition of the battery module is determined. Subsequently, based on the present operating condition and the future operating condition, a second balancing target type is selected S406 among a plurality of predetermined balancing target types. As described above each of the balancing target types is indicative of a battery unit characteristic to be balanced in order to achieve the balancing target type. Further there is a step of switching S408 from balancing the battery module according to the first balancing target type to balancing the battery module according to the second balancing target type.

Figure 5:
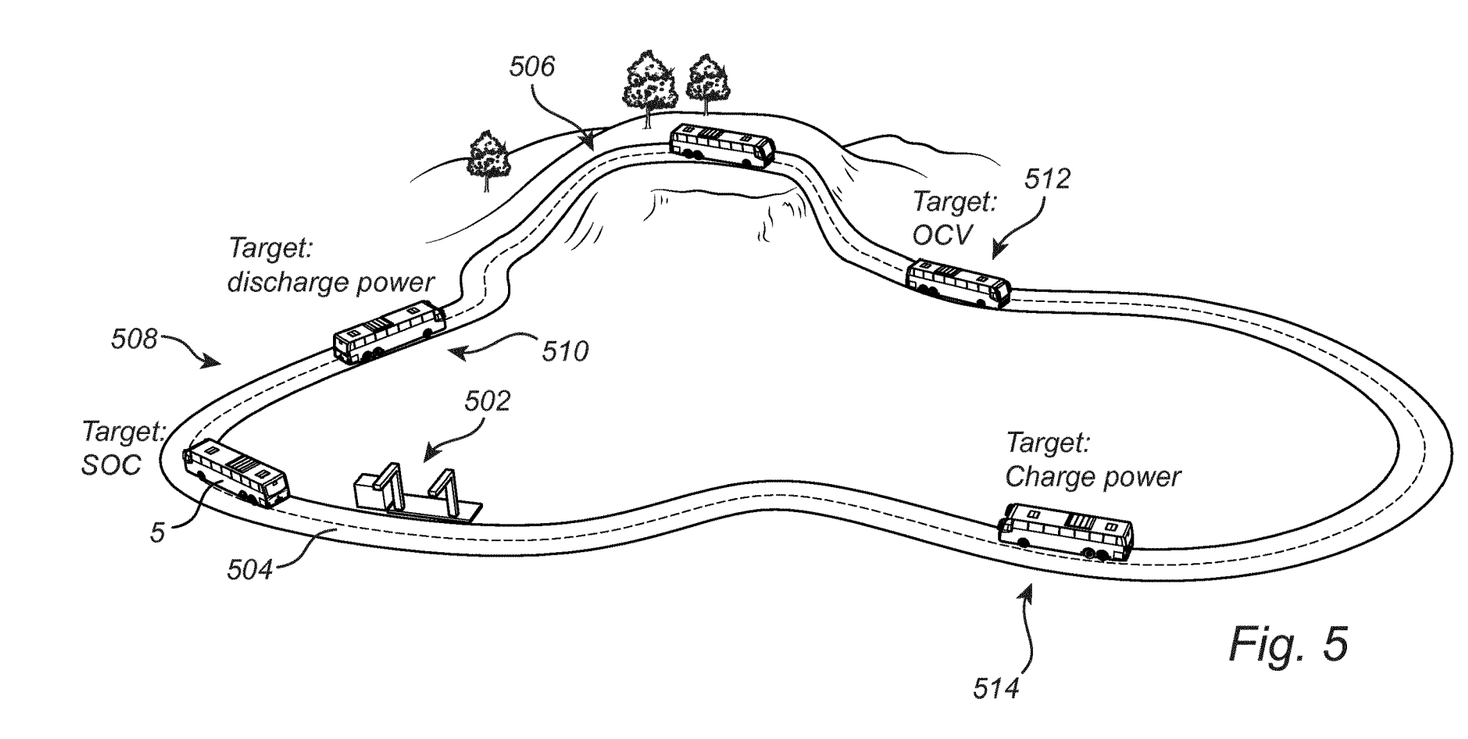
FIG. 5 illustrates a use-case for an electrical bus travelling on a route.

FIG. 5 conceptually illustrates an electrical bus 5 travelling on a route 504. Along the route there is a charging station 502 and an uphill 506 requiring substantial power to climb. In this exemplary case it is assumed that the electrical bus 5 has just left the charging station 502 to travel along the route 504 in a clockwise direction. This route 504 may be predetermined or may be received online as the bus travels on the route. During a first range 508 of the route 504, with the battery module being recently charged at the charging station 502, the battery management unit may balance the battery module according to state of charge. Thus, being recently charged the state of charge may be known with sufficiently high accuracy for balancing according to state of charge. Balancing with respect to state of charge is also advantageous for uniform aging of the battery units. Subsequently, at location 510 a time before reaching an obstacle in the form of an uphill climb 506, the future operating condition requires optimal discharge power from the battery module at the uphill 506. Another situation where optimal discharge power may be desirable is for extra driving range for the vehicle.

Some time before the optimal discharge power is desirable to utilise (at the uphill 506), the battery management unit switches from balancing according to state of charge to balancing according to discharge power such that the battery module may be balanced according to discharge power before reaching the uphill 506. The time before the optimal discharge power is desirable to utilise depends on the present state of charge but may be in the range of e.g. about 30 min-several hours.

After the uphill 506, the battery units may be at different state of charge and also somewhat discharged which may lead to uncertain estimations of state of charge. Furthermore, the future operating condition indicates that there is a relatively long driving range to the next charging event. In addition, the present operating condition may indicate a relatively high battery unit temperature after the climb at 506. Overall, the battery management unit determines to switch from balancing according to discharge power to balancing according to a further balancing target type being open circuit voltage at location 512.

At a later time, at location 514, the future operating condition indicates a time (or range) to the next charging event, in particular, here the bus 5 is approaching the charging station 502. Thus, the battery management unit determines the present operating condition which may for example be a low average charge power with a relatively high peak charge power, and the future operating condition being that in a certain time there will be a charging event. The battery management unit then determines that in order to optimize the operating condition for the battery module to the charging event, the balancing target type is switched from balancing according to open circuit voltage, to balancing according to charge power capability (i.e. according to curves 302 and 312 in FIGS. 3a-b).

It should be noted that the use-case in FIG. 5 is shown for exemplary purposes and that switching between other balancing target types is also possible, and that additional future operating conditions are possible.

Furthermore, embodiment according to the invention may also be used for switching to a balancing target type suitable for an entire route, such as the route 504. For example, the bus 5 may first be travelling on the route 504 in which route information about this specific route 504 may be used for choosing a first balancing target. Subsequently, it may be determined that the bus 5 is to be travelling on a different route (not shown) which may be e.g. a long range route with no hills. Thus, it may in this case be determined to switch to a second balancing target type which is more suitable for the entire long range route whereby balancing according to e.g. state of charge. In this case, more time may be available (i.e. during changing of route) for the balancing according to the second balancing type and the balancing may be operative for hours up to days. This of course applies also to other types of vehicle, e.g. heavy duty vehicles such as a truck travelling on long or intermediate distance routes, and may often travel along the same route, but occasionally changes route in which another balancing target type may be more suitable due to e.g. distance or terrain.

Figure 6:
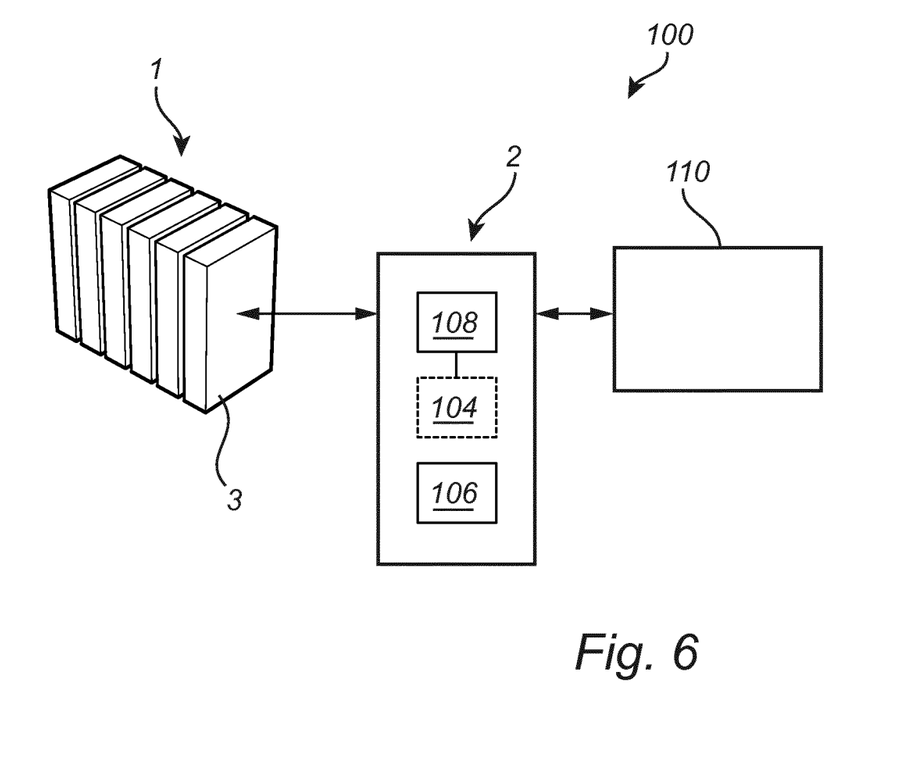
FIG. 6 conceptually illustrates a system according to an embodiment of the invention.

FIG. 6 conceptually illustrates a system according to example embodiments of the invention. The system is adapted to balance an electrical battery module 1 comprising a plurality of battery units 3. The system comprises a battery management unit 2, means 104 for determining a state of charge of the battery units and means 106 for determining an open circuit voltage of the battery units and a control unit 108. The means for determining the open circuit voltage 106 may be a voltage sensor 106 and the state of charge may be determined by e.g. an algorithm 104 running on e.g. control unit 108. The battery module 1 is operative according to a first balancing target type. The battery management unit 2 is configured to determine a present operating condition of the battery module. Determining the present operating condition may comprise to determine the open circuit voltage and/or the state of charge of the units 3 of the battery module 1. In addition, determining the present operating condition may comprise to determine the temperature, capacity, impedance, average charge power, an average discharge power, a peak charge power, or a peak discharge power. The battery management unit 2 is further configured to determine a future operating condition of the electrical battery module 1, and to select a second balancing target type to balance according to, thereby switching from the first balancing target type to the second balancing target type. The battery management unit 2 may have stored information regarding the balancing target types, or may receive the information from a remote server. For determining a future operating condition, the battery management unit has access to future use information 110. The future use information may for example be a predetermined route stored in memory or received from a remote server. Optionally, the battery management unit is in communication with a GPS 110 for receiving information regarding a future use, thus providing information for determining a future operation condition. The route information may also be received from communication with bus stops communication units 110, RFID communication 110, or GSM network 110, or any other mobile network 110, or a combination thereof.

The system may further comprise a charge unit (not shown) configured to charge the electrical battery units 3 of the electrical battery module 1. In addition, system may further comprise a discharge unit (not shown) configured to discharge the electrical battery units 3 of the electrical battery module 1. Such charge and discharge units are known in the art. For example, a discharge unit may comprise a leak resistance electrically connected across the electrical poles of the energy storage cell or group of cells via a switch circuit. When the switch circuit connects the leak resistance across the cell(s), the cell(s) may dissipate its power through the leak resistance. This type of balancing is known in the art as passive balancing. However, the balancing may be performed in various ways known in the art.

A charge unit is configured to direct energy to the battery units 3 when it is determined by the battery management unit 2 (e.g. by the control unit 108) that energy is needed for charging the battery units 3 (or individual units). The charge unit may be adapted to redirect energy from an energy recovery system of the vehicle or to receive energy from a charging station and deliver the received energy to the battery units 3.

The balancing according to a balancing target type may be performed such that the distribution of battery unit characteristics of the plurality of battery units is at least approaching normal distributed, or such that the battery unit characteristics of the plurality of battery unit are equal or at least approaching equal. The balancing may be performed by adjusting the state of charge of the individual battery units to thereby affect the battery unit characteristics of the units. As an example, referring to FIG. 3a-b, in order to balance the two units with respect to discharge power, and assuming for simplicity that it is possible to balance to the peak discharge at state of charge 308 for the first unit and to the peak discharge at state of charge 318 for the second unit, it is clear that the states of charge (308, 318) are not equal. In other words, balancing with respect to one battery unit characteristics may lead to imbalance in state of charge. Alternatively, the balancing may be performed by adjusting the voltage of the individual battery units to thereby affect the battery unit characteristics of the units. Similar to the above case, balancing with respect to one battery unit characteristics (e.g. charge power) may lead to imbalance in voltage.

As is understood from the disclosure, the present invention is equally applicable to the case that the energy storage unit comprises a plurality of battery cells, and to the case that the energy storage unit is a single battery cell.

The control unit may include a microprocessor, microcontroller, programmable digital signal processor or another programmable device.

The control functionality of the present disclosure may be implemented using existing computer processors, or by a special purpose computer processor for an appropriate system, incorporated for this or another purpose, or by a hardwire system. Embodiments within the scope of the present disclosure include program products comprising machine-readable medium for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

It is to be understood that the present invention is not limited to the embodiments described above and illustrated in the drawings; rather, the skilled person will recognize that many changes and modifications may be made within the scope of the appended claims. For example, although the present invention has mainly been described in relation to an electrical bus, the invention should be understood to be equally applicable for any type of electrical vehicle.

The invention claimed is:

1. A method for balancing an electrical energy storage module comprising a plurality of energy storage units for an electric vehicle, said energy storage module is operative according to a first balancing target type, wherein said method comprising:
   determining, by the control unit, a present operating condition of said energy storage module, said present operating condition comprising at least one of an average charge power, an average discharge power, a peak charge power, a peak discharge power, energy storage unit temperature, or ambient temperature, capacity, open circuit voltage, impedance, of the energy storage units or combinations thereof;
   determining, by the control unit, a future operating condition of said energy storage module by receiving said future operating condition from a remote server or memory, said future operating condition comprising at least one of: time to a charging event and magnitude of the charging event, time to discharging event and magnitude of the discharging event, range of driving cycle, required driving range, or combinations thereof;
   selecting, by the control unit, a second balancing target type among a plurality of predetermined balancing target types based on said present operating condition and said future operating condition, each of said first and second balancing target types being indicative of a respective energy storage unit characteristic to be balanced, which is different from the other respective energy storage unit characteristic to be balanced according to the other balancing target type, wherein a respective energy storage unit characteristic is any one of a charge power capability, discharge power capability, energy storage unit temperature, energy storage unit aging rate, energy storage unit impedance, open circuit voltage and state of charge; and
   switching, by the control unit, from balancing said energy storage module according to said first balancing target type to balancing said energy storage module according to said second balancing target type.

2. The method according to claim 1, characterized in that said future operating condition is determined based on route information for the vehicle.

3. The method according to claim 2, characterized in that said route information is received from a global positioning system from communication with bus stops communication units, via radio frequency identification communication, a GSM network, or any other mobile network.

4. The method according to claim 2, characterized in that said route information is indicative of a predetermined route for said vehicle, said method being characterized by the further step of: retrieving said route information before said vehicle is operative on said predetermined route.

5. The method according to claim 1, characterized in that the step of balancing according to a balancing target type comprises: discharging or charging selected energy storage units such that the distribution of energy storage unit characteristics of the plurality of energy storage units is normal distributed, or such that the energy storage unit characteristics of the plurality of energy storage unit is equal.

6. The method according to claim 1, characterized in that said energy storage unit is a battery cell and said energy storage module is a battery pack for said vehicle.

7. A non-transitory computer-readable storage medium having instructions stored which, when executed by a processor, cause the processor to perform operations comprising the steps of claim 1.

8. A control unit for controlling balancing of an energy storage module comprising a plurality of energy storage units for an electric vehicle, the control unit being configured to perform the steps of the method according to claim 1.

9. A system for balancing an electrical energy storage module comprising a plurality of energy storage units for an electric vehicle, said system comprising a battery management unit comprising means for determining a state of charge of the energy storage units and means for determining an open circuit voltage of the energy storage units and a control unit, said energy storage module is operative according to a first balancing target type, the battery management unit being configured to: determine a present operating condition of said energy storage module, said present operating condition comprising at least one of an average charge power, an average discharge power, a peak charge power, a peak discharge power, energy storage unit temperature, or ambient temperature, capacity, open circuit voltage, impedance, of the energy storage units or combinations thereof; determine a future operating condition of said electrical energy storage module by receiving said future operating condition from a remote server or memory, said future operating condition comprising at least one of: time to a charging event and magnitude of the charging event, time to discharging event and magnitude of the discharging event, range of driving cycle, required driving range, or combinations thereof; select a second balancing target type among a plurality of predetermined balancing target types based on said present operating condition, said future operating condition, each of said balancing target types being indicative of a respective energy storage unit characteristic to be balanced, which is different from the other respective energy storage unit characteristic to be balanced according to the other balancing target type, wherein a respective energy storage unit characteristic is any one of a charge power capability, discharge power capability, energy storage unit temperature, energy storage unit aging rate, energy storage unit impedance, open circuit voltage and state of charge; and switch from balancing said energy storage module according to said first balancing target type to balancing said energy storage module according to said second balancing target type.

10. The system according to claim 9, characterized in that said system further comprises a discharging unit configured to, according to a balancing target type, discharge selected energy storage units such that the distribution of energy storage unit characteristics of the plurality of energy storage units is normal distributed, or such that the energy storage unit characteristics of the plurality of energy storage units is equal.

11. The system according to claim 9, characterized in that said system further comprises a charging unit configured to, according to a balancing target type, charge selected energy storage units such that the distribution of energy storage unit characteristics of the plurality of energy storage unit is normal distributed, or such that the energy storage unit characteristics of the plurality of energy storage units is equal.

12. The system according to claim 9, characterized in that said future operating condition is determined based on route information for the vehicle.

13. The system according to claim 12, characterized in that battery management unit is configured to receive said route information from a GPS in said vehicle, from communication with bus stops communication units, RFID communication, GSM network, or any other mobile network.

14. The system according to claim 9, characterized in that said energy storage unit is a single battery cell and said energy storage module is a battery pack for said vehicle.

15. A vehicle comprising: an energy storage module comprising a plurality of energy storage units; and a system according to claim 9.

16. The vehicle according to claim 15, wherein the vehicle is an electrical vehicle comprising an electrical engine, wherein said energy storage module provides power to said electrical engine for providing propulsion for said electrical vehicle.

\* \* \* \* \*